Patented Aug. 2, 1932

1,870,018

UNITED STATES PATENT OFFICE

WILLIAM HENRY MOSS AND KENNETH H. CRUTCHFIELD, OF CUMBERLAND, MARYLAND, ASSIGNORS TO CELANESE CORPORATION OF AMERICA, A CORPORATION OF DELAWARE

LAMINATED GLASS AND METHOD OF MAKING THE SAME

No Drawing.  Application filed November 2, 1928. Serial No. 316,872.

This invention relates to the preparation of laminated glass and relates more particularly to the use of a special adhesive for causing sheets of celluloid-like material to adhere to glass.

An object of our invention is to use as an adhesive for causing the celluloid sheet to adhere to glass, a coating composition containing a synthetic resin made by condensing urea, phenol and an aldehyde. Other objects of our invention will appear from the following detailed description.

The adhesive coatings that have been heretofore proposed for use in causing sheets containing cellulose nitrate to adhere to glass are not suitable for use in making laminated glass that contains plastic sheet containing organic derivatives of cellulose. We have found, however, that very suitable adhesives for causing plastic sheets of organic derivatives of cellulose to adhere to glass may be prepared by dissolving urea-phenol-aldehyde resin compatible with organic derivatives of cellulose in a suitable solvent.

In accordance with our invention, we prepare well stuck laminated glass by interposing one or more sheets of plastic composition containing a derivative of cellulose between two or more sheets of glass, the sheets of the plastic composition or of the glass or both having been previously coated with a coating composition containing a urea-phenol-aldehyde resin that is compatible with the derivative of cellulose. The assembled sheets are then pressed at elevated temperature to cause adhesion between the component parts to produce a well stuck shatterless laminated glass with substantially no letgoes.

The term "phenol" as herein employed includes not only simple phenol but also any suitable aromatic compound that contains a hydroxyl group such as cresols, and substituted phenols or cresols.

The glass employed may be any suitable blown, plate or any other glass that is appropriate for use in automobile wind-shields or windows, railroad car windows, or in other places where a shatterless laminated glass is to be employed.

In one form of our invention, the laminated glass is prepared by interposing a celluloid sheet made of a plastic composition containing derivatives of cellulose between sheets of glass. The plastic sheet may be either cellulose nitrate or an organic derivative of cellulose. These organic derivatives of cellulose may be esters of cellulose such as cellulose acetate, cellulose formate, cellulose propionate or cellulose butyrate, or cellulose ethers such as ethyl cellulose, methyl cellulose or benzyl cellulose. These sheets may contain appropriate plastifiers such as camphor, triacetin, diethyl phthalate, diethyl tartrate, dibutyl tartrate, etc. and also if desired pigments and/or dyes, particularly those of a violet tint opposed to yellowness. If desired, stabilizers such as urea may be also added to the derivatives of cellulose. In the selection of ingredients it is of importance to select such combination that the whole is substantially light-fast.

In another form of our invention, a sheet of celluloid-like material need not be employed as such, but may be built up on the glass to be laminated as will be described below.

The adhesive to be employed for the lamination process is a coating composition containing a synthetic resin formed by condensing urea, phenol and an aldehyde, such as formaldehyde. An example of one method of preparing this urea-phenol-formaldehyde resin is as follows: 100 parts of phenol, 20 parts of urea and 150 parts of formaldehyde (40%) are refluxed at 125° C. for two hours. The brown liquid obtained is vacuum distilled until a soft resinous product remains. It is soluble in alcohol, benzyl alcohol, ethyl lactate and in relatively high concentration in acetone. Dilute solutions in acetone are cloudy.

A second method of preparation of the resin is: 100 parts of phenol, 5 parts of urea and 112 parts of formaldehyde solution (40%) are refluxed for four hours at 125° C. The resulting liquid is vacuum distilled, until a soft resinous product remains. This product is completely soluble in acetone, benzyl alcohol, butyl alcohol, ethyl lactate, etc.

The coating composition containing the synthetic resin preferably should contain any of the derivatives of cellulose mentioned above, and also may contain other resins, natural or synthetic, suitable plastifiers or softening agents, dyes or stabilizers above described. If a derivative of cellulose is used in the adhesive coating composition, it may preferably be of low viscosity characteristics.

While ordinary cellulose derivatives may be used in making either the celluloid sheets or the coating compositions to be used as an adhesive, we have found that much better results from the point of view of light fastness may be obtained by employing specially purified derivatives of cellulose. The derivative of cellulose such as cellulose acetate or nitrate may be purified by careful and thorough filtrations of solutions of the same.

In order to further illustrate our invention but without being limited thereto, a few examples of suitable coating compositions for use as an adhesive in making laminated glass are now given.

The following is an example of a coating composition containing the resin as the sole solid constituent:

|   | Parts by weight |
|---|---|
| Urea-phenol-formaldehyde resin | 10 |
| Acetone | 20 |
| Alcohol | 10 |

Plastifiers may be added to the coating compositions, and the following are examples of this:

(a)

|   | Parts by weight |
|---|---|
| Urea-phenol-formaldehyde resin | 10 |
| Diethyl phthalate | 4 |
| Acetone | 30 |
| Alcohol | 10 |

(b)

|   | Parts by weight |
|---|---|
| Urea-phenol-formaldehyde resin | 10 |
| Triacetin | 4 |
| Acetone | 20 |
| Alcohol | 10 |

Often it is desirable to add another synthetic resin to the adhesive coating composition and the following is an example of this:

|   | Parts by weight |
|---|---|
| Urea-phenol-formaldehyde resin | 8 |
| Diphenylol propane-formaldehyde resin | 10 |
| Acetone | 50 |
| Ethyl alcohol | 25 |
| Benzene | 25 |
| Ethyl lactate | 5 |

As previously stated, the coating compositions may also contain derivatives of cellulose, and the following is an example of this.

|   | Parts by weight |
|---|---|
| Urea-phenol-formaldehyde resin | 15 |
| Cellulose acetate | 15 |
| Triacetin | 3 |
| Acetone | 50 |
| Alcohol | 25 |
| Benzene | 25 |
| Diacetone alcohol | 10 |

The cellulose acetate in this formula may be replaced in whole or in part by cellulose propionate or cellulose butyrate.

The coating composition may also contain cellulose nitrate, and the following are examples of this:

(a)

| Cellulose nitrate | 0.4 kilograms |
|---|---|
| Camphor | 0.1 kilograms |
| Dibutyl phthalate | 0.1 kilograms |
| Urea-phenol-formaldehyde resin | 1.0 kilograms |
| Benzene | 20 liters |
| Alcohol | 10 liters |
| Butyl alcohol | 20 liters |
| Butyl acetate | 20 liters |
| Ethyl acetate | 30 liters |

(b)

| Cellulose nitrate | 6 kilograms |
|---|---|
| Camphor | 2 kilograms |
| Dibutyl phthalate | 2 kilograms |
| Urea-phenol-formaldehyde resin | 10 kilograms |

Solvents as in the previous example.

It may be stated that an adhesive containing cellulose nitrate and a resin is preferred when plastic sheets containing cellulose nitrate are to be laminated.

In applying the adhesive coating composition in accordance with our invention, the same may be spread by flowing, spraying, dipping or brushing as desired. While the usual practice is to apply the adhesive to the surfaces of the glass and not to the plastic sheet containing the derivative of cellulose such as cellulose acetate, if desired, the adhesive may also be applied to the surfaces of the cellulose derivative sheet also. Sometimes it is preferable to apply two or more coats of the coating composition on the glass or plastic sheets, which coats may be of the same composition or of different composition. It is at times advisable first to apply a coat of coating composition having a larger amount of synthetic resin and then to apply coats of adhesive containing less resin and more derivative of cellulose and/or plastifier.

When a plastic sheet or derivative of cellulose is used in making the laminated glass, after a suitable quantity of adhesive has been applied to surfaces, the plastic sheet is inserted between the sheets of glass, and the same is pressed in a suitable press at elevated temperatures. The temperature and pressure that are employed may be varied considerably in accordance with the properties of the coating composition and the plastic sheets.

It is also within the scope of this invention to dispense with the use of plastic sheets in making the laminated glass. In this modification, a film or sheet is built upon the sheets of glass to be laminated by applying the coating composition herein described, until a layer of sufficient thickness is formed. As a variation, the glass may be coated with the adhesive coating composition herein described and then further coats of a coating composition containing derivatives of cellulose but not necessarily containing resin are applied until a film or sheet of sufficient thickness for lamination is formed.

The adhesive coating composition after it is applied may be dried by gentle heat, say for instance, 50° to 100° C. for 15 to 60 minutes, or by longer drying at ordinary temperature.

The laminated glass made in accordance with this invention is well stuck, free of letgoes, and when struck by a sharp blow, the pieces of broken glass adhere firmly to the cellulose derivative sheet. Moreover, the laminated glass is light-fast and does not discolor appreciably when exposed to ultraviolet light for a long time.

It is to be understood that the foregoing detailed description is given merely by way of illustration and that many variations may be made therein without departing from the spirit of this invention.

Having thus described our invention, what we claim and desire to secure by Letters Patent is:

1. In the method of forming laminated glass having a layer of a material containing an organic derivative of cellulose between sheets of glass, the step of applying an adhesive coating composition containing a urea-phenol-aldehyde resin that is compatible with said derivative of cellulose.

2. In the method of forming laminated glass having a layer of a material containing an organic derivative of cellulose between sheets of glass, the step of applying an adhesive coating composition containing an organic derivative of collulose and a urea-phenol-aldehyde resin that is compatible with said organic derivative of cellulose.

3. In the method of forming laminated glass having a layer of a material containing cellulose acetate between sheets of glass, the step of applying an adhesive coating composition containing a urea-phenol-aldehyde resin that is compatible with said cellulose acetate.

4. In the method of forming laminated glass having a layer of a material containing an organic derivative of cellulose between sheets of glass, the step of applying an adhesive coating composition containing a urea-phenol-formaldehyde resin.

5. In the method of forming laminated glass having a layer of a material containing cellulose acetate between sheets of glass, the step of applying an adhesive coating composition containing a urea-phenol-formaldehyde resin.

6. The method of making laminated glass comprising coating the surface of at least one of the components of glass and a plastic sheet containing an organic derivative of cellulose with an adhesive coating composition containing a urea-phenol-aldehyde resin and an organic derivative of cellulose, interposing the plastic sheet between the sheets of glass and then pressing at suitable temperatures.

7. The method of making laminated glass comprising coating the surface of at least one of the components of glass and a plastic sheet containing cellulose acetate with an adhesive coating composition containing a urea-phenol-aldehyde resin and cellulose acetate, interposing the plastic sheet between the sheets of glass and then pressing at suitable temperatures.

8. The method of making laminated glass comprising coating the surface of at least one of the components of glass and a plastic sheet containing an organic derivative of cellulose with an adhesive coating composition containing a urea-phenol-formaldehyde resin and an organic derivative of cellulose, interposing the plastic sheet between the sheets of glass and then pressing at suitable temperatures.

9. The method of making laminated glass comprising coating the surface of at least one of the components of glass and a plastic sheet containing cellulose acetate with an adhesive coating composition containing a urea-phenol-formaldehyde resin and cellulose acetate, interposing the plastic sheet between sheets of glass and then pressing at suitable temperatures.

10. Laminated glass having at least one layer of a plastic sheet containing an organic derivative of cellulose interposed between sheets of glass and having a film of a urea-phenol-aldehyde resin to cause adhesion between the plastic sheet and the glass.

11. Laminated glass having at least one layer of a plastic sheet containing cellulose acetate interposed between sheets of glass and having a film of a urea-phenol-aldehyde resin to cause adhesion between the plastic sheet and the glass.

12. Laminated glass having at least one layer of a plastic sheet containing an organic cellulose derivative interposed between sheets of glass and having a film containing a urea-phenol-aldehyde resin and an organic derivative of cellulose to cause adhesion between the plastic sheet and the glass.

13. Laminated glass having at least one layer of a plastic sheet containing an organic derivative of cellulose interposed between sheets of glass and having a film containing a urea-phenol-formaldehyde resin to cause adhesion between the plastic sheet and the glass.

14. Laminated glass having at least one layer of a plastic sheet containing cellulose acetate interposed between sheets of glass and having a film containing a urea-phenol-formaldehyde resin to cause adhesion between the plastic sheet and the glass.

15. Laminated glass having at least one layer of a plastic sheet containing an organic derivative of cellulose interposed between sheets of glass and having a film containing a urea-phenol-formaldehyde resin and an organic derivative of cellulose to cause adhesion between the plastic sheet and the glass.

16. Laminated glass having at least one layer of a plastic sheet containing cellulose acetate interposed between sheets of glass and having a film containing a urea-phenol-formaldehyde resin and cellulose acetate to cause adhesion between the plastic sheet and the glass.

In testimony whereof, we have hereunto subscribed our names.

WILLIAM HENRY MOSS.
KENNETH H. CRUTCHFIELD.